July 12, 1927.
G. W. MacKENZIE
1,635,720
LIQUID DISPENSING APPARATUS
Filed Jan. 8, 1926
2 Sheets-Sheet 1
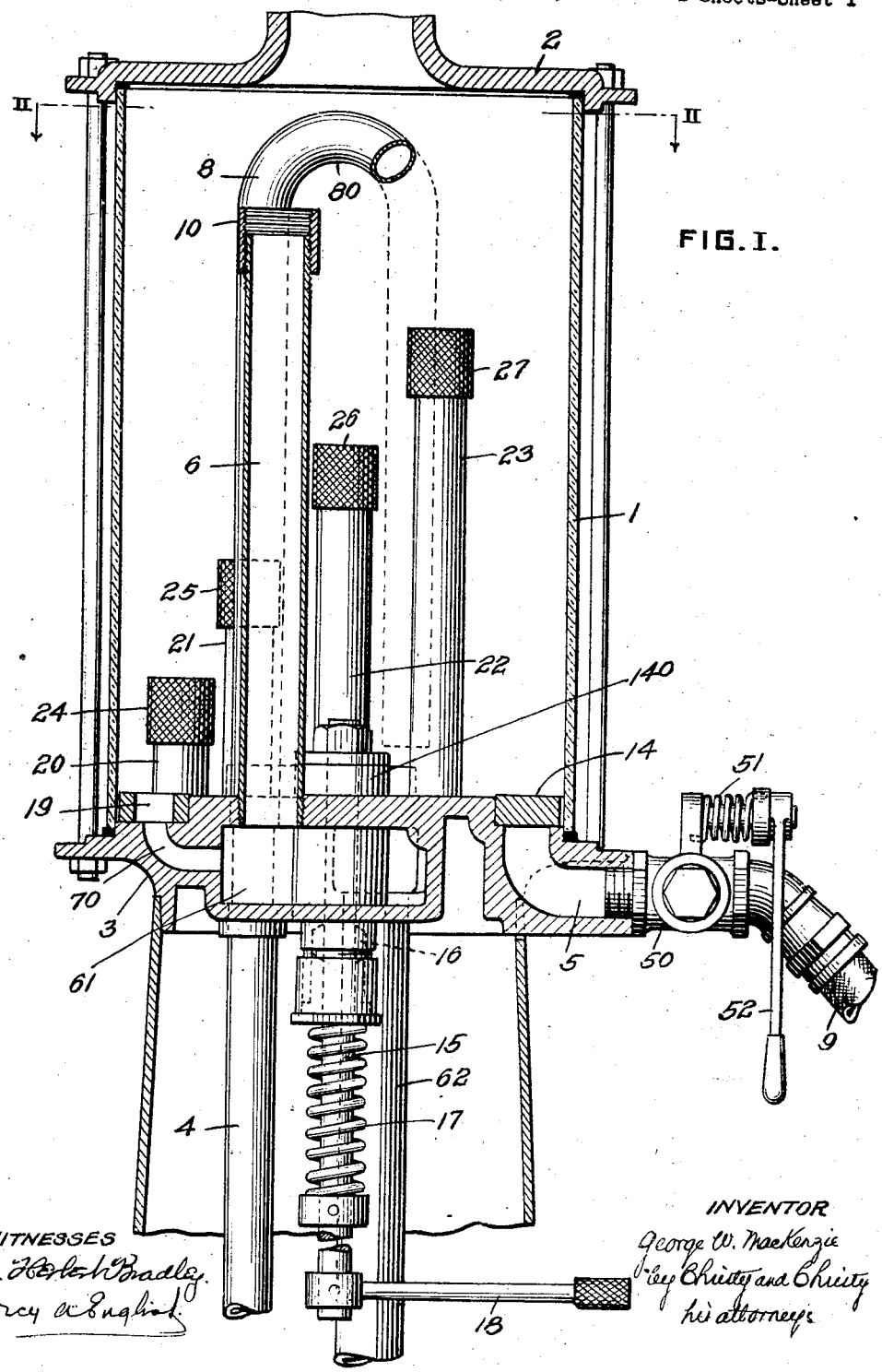
FIG. I.
WITNESSES
INVENTOR
George W. MacKenzie
by Christy and Christy
his attorneys July 12, 1927.
G. W. MacKENZIE
1,635,720
LIQUID DISPENSING APPARATUS
Filed Jan. 8, 1926
2 Sheets-Sheet 2
FIG. II.
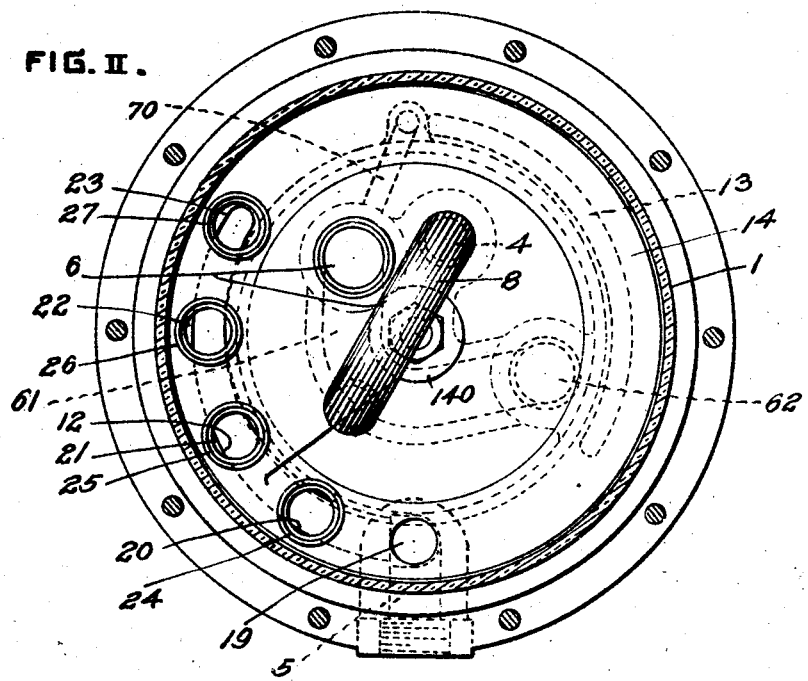
FIG. III.
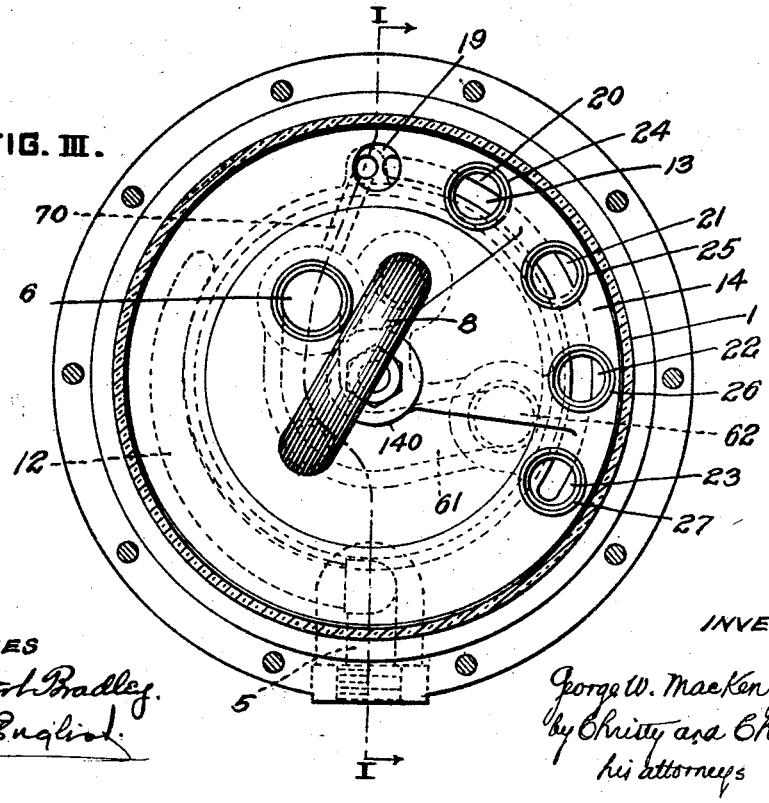
WITNESSES
J. Herbert Bradley
Percy A. English
INVENTOR
George W. MacKenzie
by Christy and Christy
his attorneys Patented July 12, 1927.

1,635,720

UNITED STATES PATENT OFFICE.

GEORGE W. MacKENZIE, OF BEAVER, PENNSYLVANIA, ASSIGNOR TO CORRECT MEASURE COMPANY, OF ROCHESTER, PENNSYLVANIA, A CORPORATION OF PENNSYLVANIA.

LIQUID-DISPENSING APPARATUS.

Application filed January 8, 1926. Serial No. 79,978.

My invention relates to liquid-dispensing apparatus; it has been developed in particular application to apparatus for dispensing gasoline, and while it is of general applicability in dispensing liquid, I shall show and describe it in the particular application mentioned. It constitutes an improvement upon apparatus such as that shown and described in an application for Letters Patent of the United States, filed October 17, 1925, by John R. Foster and Frank Woodruff; Serial No. 63,041. The invention lies in simplification of structure.

Fig. I of the accompanying drawings is a view in vertical section through the measuring chamber and the immediately associated parts of gasoline-dispensing apparatus of my invention; Figs. II and III are views in horizontal section, and show the valve-plate within the measuring chamber in alternate positions. The plane of section of Fig. I is indicated in Fig. III by the broken line I—I; the plane of section of Figs. II and III, is indicated at II—II, Fig. I.

The measuring chamber conveniently takes the form of a transparent cylinder 1, of glass, bolted between metal heads 2 and 3. Through the lower head, which constitutes its bottom, three conduits have communication with the measuring chamber. An inlet pipe 4 passes in liquid-tight engagement through an opening in the lower head, and is prolonged within the measuring chamber in a U-shaped termination 8 which preferably rises to a height within the measuring chamber exceeding the maximum level to which in normal operation the introduced tide of gasoline attains. From such maximum height the inlet pipe descends again to proximity to the bottom of the chamber, and the end of the pipe is open. It will be understood that suitable means are provided—a pump, for instance—for causing gasoline to flow when desired in sufficient stream through pipe 4 to fill the measuring chamber. In Fig. I the downwardly extending end of the inlet pipe is diagrammatically indicated in dotted lines. At the turn of the U-shaped extension 8 of the inlet pipe, at the point indicated by the numeral 80, a vent is formed, to prevent siphon action within the pipe during operation.

The lower head 3 of the measuring chamber is formed as a chambered casting. The inlet pipe penetrates it directly, as has been indicated. A chamber 61 within the casting is brought into communication with the interior of the measuring chamber through an overflow pipe 6, and this chamber in turn communicates through a return pipe 62 to a suitable place of discharge. Ordinarily a subterranean storage tank will be provided, and from such tank gasoline will be pumped or drawn through inlet pipe 4 to the measuring chamber, and to such tank the overflow from the measuring chamber will through overflow pipe 6 chamber 61 and return pipe 62, be returned.

The height of the overflow pipe 6 within the measuring chamber is such that when a sufficient quantity of gasoline has been delivered through the inlet pipe, the excess of delivery, whatever there may be, will escape and will return to the storage tank. The presence of the overflow pipe 6, then, insures the retention, on filling, of an exactly measured maximum volume; for instance, five gallons. The overflow pipe 6 is provided with an adjustable rim 10, to the end that the accuracy of the measurement which it effects may be precise.

A third opening, 5, through the lower head of the measuring chamber constitutes a delivery orifice. It opens from the level of the bottom of the measuring chamber, and the passageway is continued in a delivery hose 9. This is the delivery hose of familiar character, through which gasoline may be delivered to the tank in a customer's car or to another receptacle. A valve in a suitable casing 50 controls delivery. This ordinarily will be a spring-closed valve, opened manually by swinging a crank 52 against the tension of the valve-closing spring 51.

Within the casting which constitutes the lower head of the measuring chamber, a duct 70 is formed. It opens from the measuring chamber at the level of the bottom, and it leads to chamber 61.

Reference to Fig. II will show that the inlet pipe 8 and the overflow pipe 6 are arranged at one radial interval from the axis of the cylindrical measuring chamber, and that the opening to the delivery 5 and the opening through duct 70 are arranged at another, and in this case a greater interval from that axis. A valve is provided, in the form of a rotary plate 14, overlying the bottom of the measuring chamber, extending substantially to the periphery of the circular bottom of the measuring chamber, and bearing with liquid-tight engagement upon the surface of the casting which constitutes the bottom of the measuring chamber. The plate 14 is preferably circular, and is cut away in part, as indicated in Figs. II and III, to allow free turning, without interference (whatever be its position) with the inlet and overflow pipes 8 and 6, which rise through the cut-away opening in the plate. Accordingly, the valve plate 14 becomes essentially an annulus. Its peripheral portion may advantageously be countersunk in the upper surface of the casting which constitutes the lower head of the measuring chamber. The plate 14 through a hub 140 formed integrally with it, is carried on an axial stem 15. This stem is prolonged through a packing gland 16, and the plate is held in liquid-tight engagement upon the surface of the casting 3 by the tension of a spring 17 which engages a collar on the stem. This stem is provided with an operating crank arm 18. By means of this crank arm the valve plate 14 is rotatable. In rotation it interferes in no respect with inlet and overflow, but, uncovering in alternation the delivery orifice 5 and the duct 70, it alternately opens the measuring chamber to be emptied, either through hose 9 to a customer or through the chambered casting 3, back to the storage tank.

Plate 14 is provided with a series of orifices, in this instance five, 19, 20, 21, 22, and 23, arranged in succession, and remote from the center of turning at equal distances with the orifices 5 and 70. Orifice 19 opens at the level of the upper surface of plate 14, while orifices 20, 21, 22, and 23 are provided with upward prolongations, in the form of stand-pipes 24, 25, 26, and 27. These stand-pipes rise to different levels and are so particularly measured in height that, when the measuring chamber has been filled to the precisely defined maximum (in this case five gallons), precisely defined quantities may be drawn off through one or another of the orifices. In the case in hand it may be understood that through orifice 23 with its stand-pipe 27 one gallon may be drawn; through orifice 22, two gallons; through 21, three gallons; through 20, four; while through orifice 19, which opens flush with the bottom, the entire contents, five gallons, may be drawn from the measuring chamber. The stand-pipes 24, 25, 26, and 27 are provided at their upper ends with adjustment rims, such as that already mentioned, with which the overflow pipe 6 is provided.

The orifices 19—23 are spaced upon the plate 14 within limits somewhat less than a semi-circle with respect to the center of plate rotation, and the orifices 5 and 70 open at diametrically opposite points in the surface of the lower head of the measuring chamber. Accordingly, the plate may be shifted to a position in which all of the orifices 19—23 are beyond the position of registry with delivery orifice 5 (Fig. III) and from that position to one in which any of the orifices 19—23 is in registry with orifice 5.

When the parts are in the position shown in Fig. III the orifice 19 is in registry with orifice 70. Orifice 19, it will be remembered, opens flush with the surface of plate 14. Accordingly, so long as this position of plate 14 continues, not only can no gasoline collect in the measuring chamber, but whatever gasoline may thitherto have remained in the measuring chamber will upon the return of plate 14 to the position shown in Fig. III, drain back without hindrance to the storage tank.

From the position shown in Fig. III the direction of turning is clockwise. An initial turning of the plate through approximately 30° will effect closure of orifice 70 by valve plate 14, and then the measuring chamber may be filled. The provisions for filling have been sufficiently indicated. Gasoline flows through the inlet pipe 4 with its U-shaped extension, and, by virtue of the provision of the U-shaped extension, gasoline rises in the chamber in a smooth-surfaced tide. When the chamber has so been filled, the supply is shut off. The presence of the overflow pipe 6 makes accurate measurement, and by returning the excess makes sure the retention within the measuring chamber of precisely the desired quantity— in this instance five gallons.

The measuring chamber being filled, further turning of the plate 14 clockwise through an interval of 30° brings orifice 23 to registry with orifice 5. Orifice 23 is prolonged in stand-pipe 27, and the proportions are such that through stand-pipe 27 precisely one gallon of the five gallons segregated in the measuring chamber has access to orifice 5. When then the plate 14 has come to the position last indicated, opening of the valve in casing 50 will effect delivery to the customer of precisely one gallon.

Similarly, the shifting of the plate 14 to any of the successive positions in which orifices 22, 21, 20, and 19 are in registry with orifice 5, and the ensuing opening of the control valve in casing 5, will effect the delivery of two, three, four, or five gallons. And it will further be apparent that, one, two, three, or four gallons having been withdrawn, a new shifting of the plate clockwise followed by opening of the control valve, will achieve the delivery of a second measured quantity of gasoline. And this without refilling of the measuring chamber. Fig. II shows the plate 14 in position with orifice 19 in registry with orifice 5, and when the plate is in that position, all gasoline within the measuring chamber may on the opening of the control valve, be drawn off.

After part or all of the five gallons initially segregated in the measuring chamber have been delivered, the plate 14 may be turned in opposite and counter-clockwise direction and brought again to the position shown in Fig. III. Thereupon any part of the five gallons initially segregated and still remaining in the measuring chamber will return through orifice 70, chamber 61, and return pipe 62, to the storage tank.

In association with the crank-arm 18, and in a manner well known to the art, a graduated succession of marks may be provided, that the operator may know, in what particular position the valve plate stands. If, the valve plate being in the position shown in Fig. III, two gallons are to be delivered to a customer, the plate is by means of the crank arm 18 first shifted to filling position, indicated above, and the measuring chamber is filled. This filling position is not necessarily precisely limited. It is requisite only that the orifice 19 through the valve plate 14 shall be remote from the return passageway 70. It may be the position in which the apparatus is ready for the delivery of the desired volume of gasoline. After the measuring chamber has been filled, the plate 14 will, if not already in the position desired, be shifted to the position, indicated to the operator, in which orifice 22 registers with orifice 5. When this has been done the control valve is opened and two gallons are delivered. One or more of the remaining three gallons may in ensuing operations be drawn off, and always the possibility remains of shifting plate 14 again to initial position and returning to the storage tank whatever gasoline the measuring chamber contains.

A gutter 12 is formed in the upper face of the casting 3, underlying the course in which the orifices 23, 22, 21, and 20 advance, as the orifices 22, 21, 20, and 19 are brought to registry with orifice 5. The purpose of this groove is that the level of the liquid shall sink equally within the stand-pipes as within the chamber external to the stand-pipes. Similarly, a gutter 13 is formed in the bottom casting, underlying the course of advance of the orifices when the plate is turning counter-clockwise and approaching the return position of Fig. III. This gutter 13, however, does not extend all the way to the outlet 70; its proximate end is remote from outlet 70 by an interval which added to the diameter of orifice 70 is less than the diameter of orifice 19. When the orifice 19 has reached the limit of counter-clockwise turning and has come to rest in registry with orifice 70, it still bridges the interval and is also in communication with gutter 13. From this it follows that when the plate 14 is in this position the stand-pipes and the measuring chamber as well drain freely back to the storage tank; all the gasoline remaining is the small quantity which rests in and fills the gutter 13 itself.

When the plate 14 is turned clockwise from the position shown in Fig. III, the outlet 70 is first cut off, and the interval at which the outlet is remote from the end of the gutter is sufficient, so that the plate 14 held downward by spring tension adequately and effectively closes orifice 70. When the orifice has so been closed, the turning of the plate 14 may be arrested and the measuring chamber may be filled. When the measuring chamber has been filled, further clockwise turning will bring the desired orifice to registry with orifice 5.

I claim as my invention:

1. In liquid-dispensing apparatus a measuring chamber provided through its bottom with a delivery orifice and a return orifice, and a valve plate provided with a succession of orifices opening at different levels movable upon the bottom of the measuring chamber from a position in which the lowest orifice in the valve plate is in registry with the return orifice in the chamber bottom to successive positions, in one of which both orifices in the chamber bottom are closed and in succeeding positions one and another of the orifices in the valve plate are in registry with the delivery orifice in the chamber bottom, the bottom of the chamber being provided with a gutter underlying the pathway of the orifices in the valve plate, said gutter terminating at an interval from the return orifice last mentioned, the diameter of the lowest orifice in the valve plate exceeding the extent of such interval.

2. In liquid-dispensing apparatus the combination of a measuring chamber provided with an inlet, a discharge orifice and a return orifice formed in the bottom wall of the measuring chamber, a valve controlling said discharge and return orifices, a receiving chamber arranged beneath the measuring chamber to which the said return orifice gives access, an overflow pipe rising from said receiving chamber through the bottom wall of the measuring chamber and opening above within the measuring chamber, and a return pipe leading from said receiving chamber.

3. In liquid-dispensing apparatus the combination of a measuring chamber and means for introducing liquid into said measuring chamber, a chambered casting constituting the bottom wall of said chamber the said casting being provided with two orifices, one of said orifices adapted to be brought into connection with a delivery conduit, and the other orifice opening to the chamber within the casting, an overflow pipe opening below to the chamber within the casting and rising through the bottom wall of the measuring chamber and opening above at an elevated point within the measuring chamber, a return pipe leading from the chamber within the casting, and a valve control of the orifices in the bottom wall of the measuring chamber.

4. In liquid-dispensing apparatus the combination of a cylindrical, vertically standing measuring chamber, having discharge and return passages formed through its bottom wall and opening from the measuring chamber at equal radial distances from its cylindrical axis and at diametrically opposite points, a valve plate arranged within the measuring chamber and rotatable upon the bottom wall thereof and upon the axis of the cylinder at its center of turning, the said valve plate being provided with a series of orifices adapted to open from the measuring chamber at different effective heights, such orifices being arranged at equal radial distances from the center of turning and at a distance equal to that at which the discharge and return passageways in their opening from the measuring chamber are remote from the chamber axis, the bottom wall of the measuring chamber being further provided in its upper face with a gutter extending from the discharge passageway in the arc of a circle of which the chamber axis is the center.

In testimony whereof I have hereunto set my hand.

GEORGE W. MacKENZIE.